US012750699B2

(12) United States Patent
Chen et al.

(10) Patent No.: US 12,750,699 B2
(45) Date of Patent: Sep. 29, 2026

(54) COMMUNICATION METHOD AND DEVICE, AND STORAGE MEDIUM

(71) Applicant: ZTE CORPORATION, Shenzhen (CN)

(72) Inventors: Jiajun Chen, Shenzhen (CN); Yin Gao, Shenzhen (CN); Dapeng Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 177 days.

(21) Appl. No.: 18/569,328

(22) PCT Filed: Dec. 19, 2022

(86) PCT No.: PCT/CN2022/140022

§ 371 (c)(1),
(2) Date: Dec. 12, 2023

(87) PCT Pub. No.: WO2023/134398

PCT Pub. Date: Jul. 20, 2023

(65) Prior Publication Data

US 2024/0276248 A1 Aug. 15, 2024

(30) Foreign Application Priority Data

Jan. 17, 2022 (CN) ......................... 202210050351.8

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
CPC ...... H04W 24/02; H04W 24/08; H04W 24/10
(Continued)

(56) References Cited

U.S. PATENT DOCUMENTS 7,356,392 B2 * 4/2008 Hubbard .................. G08G 1/20 701/32.7
2013/0051244 A1 * 2/2013 Bodog .................. H04W 24/02 370/252

(Continued)

FOREIGN PATENT DOCUMENTS

CN 112512058 A 3/2021
CN 112512059 A 3/2021
CN 113498076 A 10/2021

OTHER PUBLICATIONS

International Search Report in Application No. PCT/CN2022/140022, dated Feb. 20, 2023, 4 pages, including translation.

(Continued)

*Primary Examiner* — Rownak Islam
(74) *Attorney, Agent, or Firm* — Crowell & Moring LLP

(57) ABSTRACT

Provided are a communication method and device and a storage medium. A communication method applied to a first communication node includes: receiving a network optimization operation instruction, and sending a performance feedback request message to a second communication node; receiving performance feedback measurement information corresponding to the performance feedback request message and sent by the second communication node; and determining an optimization operation for a target model according to the performance feedback measurement information.

20 Claims, 5 Drawing Sheets

(58) Field of Classification Search
USPC .......................................................... 370/352
See application file for complete search history.

(56) References Cited

U.S. PATENT DOCUMENTS

| | | | | |
|---|---|---|---|---|
| 2021/0337420 | A1 | 10/2021 | Lo et al. | |
| 2023/0224752 | A1* | 7/2023 | Huang | H04L 47/822 370/252 |

OTHER PUBLICATIONS

European Search Report issued in European Patent Application No. 22920029.0 dated Jan. 27, 2025, 17 pages.
Futurewei, "Mobility Optimization—Further Discussions on Solutions and Standard Impacts" 3GPP TSG-RAN WG3 Meeting #114-bis-e, R3-220604, Jan. 17, 2022, 4 pages.
ZTE et al., "Further discussion on solution to AI based Network Energy Saving" 3GPP TSG-RAN WG3 #114bis-e, R3-220835, Jan. 17, 2022, 7 pages.
Zte et al., "Further discussion on solution to AI-based load balancing" 3GPP TSG-RAN WG3 #114bis-e, R3-220845, Jan. 17, 2022, 16 pages.
Zte, "Discussion on stage3 standards impacts of AI-RAN" 3GPP TSG-RAN WG3 Meeting #117bis-e, R3-225879, Aug. 10, 2022, 9 pages.
Huawei; "Further discussions for AI based load balancing"; 3GPP TSG-RAN WG3 E-Meeting #114bis-e; R3-220916; Jan. 17-26, 2022; 8 pages including cover sheet.
Office Action dated May 13, 2025 for Japanese Patent Application No. 2024-529539, including English translation; 8 pages total.

* cited by examiner

COMMUNICATION METHOD AND DEVICE, AND STORAGE MEDIUM

CROSS REFERENCE TO RELATED APPLICATIONS

The present application is a national stage application filed under 35 U.S.C. 371 based on International Patent Application No. PCT/CN2022/140022, filed on Dec. 19, 2022, which claims priority to Chinese Patent Application No. 202210050351.8 filed with the China National Intellectual Property Administration (CNIPA) on Jan. 17, 2022, the disclosures of which are incorporated herein by reference in their entireties.

TECHNICAL FIELD

The present application relates to the communication field, for example, a communication method and device and a storage medium.

BACKGROUND

Currently, the 5$^{th}$ generation (5G) wireless communication network is being deployed, and the Beyond 5G (B5G) network is expected to be developed in the future. Artificial intelligence (AI) technology, especially machine learning (ML), is used for proposing effective network optimization solutions by processing large amounts of data in the 5G and B5G networks. The AI/ML process includes stages such as training, inference and validation. After an AI/ML model performs inference, real measurement values need to be obtained and compared with predicted information so that the performance of the model is fed back. However, how base stations interact and feed back performance with each other and what specific parameters are included in the performance feedback information are urgent problems to be solved.

SUMMARY

Embodiments of the present application provide a communication method. The communication method is applied to a first communication node and includes the following.

A network optimization operation instruction is received, and a performance feedback request message is sent to a second communication node.

Performance feedback measurement information corresponding to the performance feedback request message and sent by the second communication node is received.

An optimization operation for a target model is determined according to the performance feedback measurement information.

The embodiments of the present application provide a communication method. The communication method is applied to a second communication node and includes the following.

A network optimization operation instruction is received, and a performance feedback request message sent by a first communication node is received.

Performance feedback measurement information corresponding to the performance feedback request message is sent to the first communication node so that the first communication node determines an optimization operation for a target model according to the performance feedback measurement information.

The embodiments of the present application provide a communication device. The device includes a communication module, a memory and one or more processors.

The communication module is configured to perform communicative interaction with another communication node.

The memory is configured to store one or more programs.

The one or more programs, when executed by the one or more processors, cause the one or more processors to implement the method according to any one of the preceding embodiments.

The embodiments of the present application provide a storage medium configured to store a computer program which, when executed by a processor, causes the processor to perform the method according to any one of the preceding embodiments.

DETAILED DESCRIPTION

Embodiments of the present application are described hereinafter in conjunction with the drawings. The present application is described hereinafter in conjunction with the embodiments and the drawings. The examples listed hereinafter are merely intended to explain the present application and not to limit the scope of the present application.

While the 5G network brings fundamental changes in performance and flexibility, the complexity of the network operation is also greatly increasing. Operators urgently need automation and intelligent means to reduce the costs of the network deployment, operation and maintenance and improve the network performance and the user experience. An embodiment of the present application provides a new communication method so that performance feedback measurement information, such as the state of the resource currently used by the base station and UE location information, of an artificial intelligence/machine learning (AI/ML) model can be interacted between base stations, and then the base station can determine whether the model needs to be updated or terminated through the performance feedback measurement information of the AI/ML model.

Figure 1:
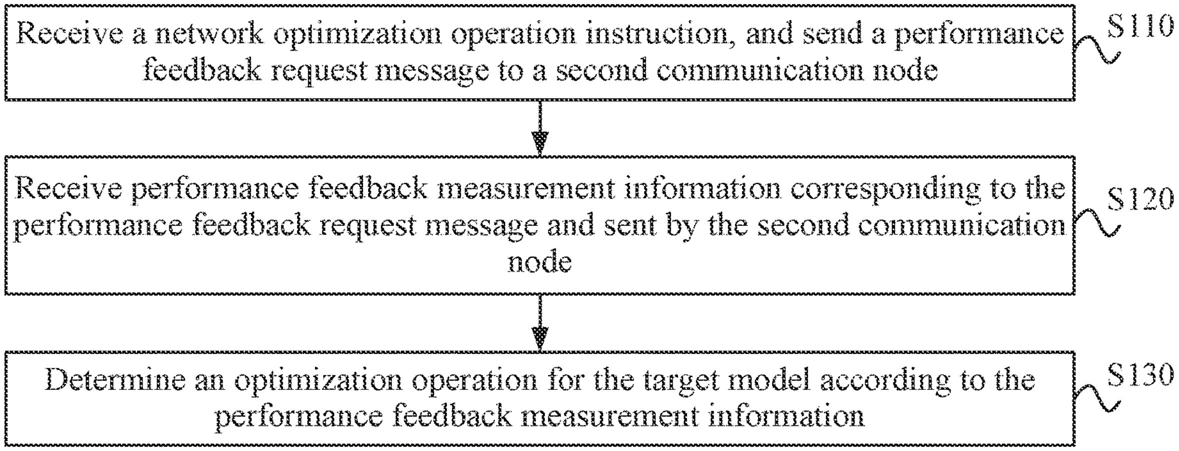
FIG. 1 is a flowchart of a communication method according to an embodiment of the present application.

In an embodiment, FIG. 1 is a flowchart of a communication method according to an embodiment of the present application. The embodiment may be performed by a first communication node. Exemplarily, the first communication node may be a next generation radio access network (NG-RAN) node. As shown in FIG. 1, the embodiment includes S110 to S130.

In S110, a network optimization operation instruction is received, and a performance feedback request message is sent to a second communication node.

The network optimization operation instruction refers to a triggering instruction of a network optimization operation executed according to an inference result of a target model. In the embodiment, after the first communication node executes the inference operation of the target model, the corresponding inference result is obtained, and the network optimization operation is executed according to the inference result. The network optimization operation may include: a user equipment (UE) handover indication, a cell turning on or off indication, a radio resource activation or deactivation indication, a power adjustment indication, a radio resource management (RRM) parameter reconfiguration indication, a flow splitting operation indication, a protocol layer parameter reconfiguration indication, etc.

In the embodiment, the performance feedback request message is a message used for indicating requesting feedback of the performance of the target model. In the embodiment, the first communication node sends parameters of the performance of the target model which are required to be measured together with the performance feedback request message to the second communication node so that the second communication node measures the performance of the target model according to the parameters which are required to be measured.

In S120, performance feedback measurement information corresponding to the performance feedback request message and sent by the second communication node is received.

In the embodiment, the performance feedback measurement information is used for characterizing the information obtained by measuring the performance of the target model. In the embodiment, the second communication node measures the performance of the target model according to the parameters which are required to be measured to obtain the performance feedback measurement information, and sends the performance feedback measurement information to the first communication node.

In S130, an optimization operation for the target model is determined according to the performance feedback measurement information.

In the embodiment, after receiving the performance feedback measurement information, the first communication node determines the optimization operation to be performed on the target model according to the performance feedback measurement information. In the embodiment, the optimization operation for the target model includes a retraining operation and a use termination operation. That is, the retraining operation may be performed on the target model, or the use termination operation may be performed on the target model.

In an embodiment, the performance feedback measurement information includes at least one of: a time duration for performance feedback, a cell identifier (ID), a cell resource state, physical resource block (PRB) usage, a cell packet data convergence protocol (PDCP) data volume, energy efficiency, system-level performance, quality of Experience (QoE) of a terminal, cell-level location information of a user equipment (UE), geographical location-level location information of a UE, accuracy of predicted information or prediction error.

The time duration for the performance feedback includes at least one of: time granularity, start time of performance feedback information or end time of performance feedback information. In the embodiment, the system-level performance may include throughput and packet loss. In the embodiment, the geographical location-level location information of the UE may include a longitude, a latitude and an altitude. In the embodiment, the accuracy of the predicted information may include one of: accuracy of predicted load, accuracy of predicted UE location or accuracy of predicted UE trajectory. The prediction error may include one of: an error of a predicted load, an error of a predicted UE location or an error of a predicted UE trajectory. In the embodiment, the time granularity refers to a time interval of the time points when the second communication node sends the performance feedback measurement information to the first communication node. The start time of the performance feedback information refers to the time point when the second communication node starts to send the performance feedback measurement information to the first communication node. The end time of the performance feedback information refers to the time point when the second communication node last sends the performance feedback measurement information to the first communication node.

In an embodiment, the performance feedback request message includes at least one of following measurement parameters: an identifier of a performance feedback data type, a UE identifier, a time duration for performance feedback or a reporting manner for performance feedback. The identifier of the performance feedback data type is configured to indicate a type of performance feedback data (feedback information). In the embodiment, the reporting manner for the performance feedback refers to whether the second communication node periodically or aperiodically reports the performance feedback measurement information to the first communication node.

In an embodiment, the performance feedback request message is included in one of following messages: a handover request message or a resource state request message. In the embodiment, when a handover interaction process is multiplexed for sending the performance feedback measurement information, the performance feedback request message is carried in the handover request message; when a resource state interaction process is multiplexed for sending the performance feedback measurement information, the performance feedback request message is carried in the resource state request message.

In an embodiment, the identifier of the performance feedback data type is configured to indicate at least one of: UE-related type data, network load-related type data, energy efficiency-related type data, prediction accuracy-related type data or prediction error-related type data.

In an embodiment, the reporting manner for the performance feedback is aperiodic reporting, and the performance feedback measurement information is included in one of following messages: a performance feedback response message, a performance feedback acknowledge message, a handover success message, a resource state response message or a resource state update massage. In the embodiment, in the case where the second communication node aperiodically reports the performance feedback measurement information to the first communication node, the second communication node may send the performance feedback measurement information through an independently established performance feedback interaction process, that is, the performance feedback measurement information is carried in the performance feedback response message or the performance feedback acknowledge message; the second communication node may also send the performance feedback measurement information by multiplexing the handover interaction process, that is, the performance feedback measurement information is carried in the handover success message; the second communication node may also send the performance feedback measurement information by multiplexing the resource state interaction process, that is, the performance feedback measurement information is carried in the resource state response message or the resource state update message.

In an embodiment, the reporting manner for the performance feedback is periodic reporting, and the communication method applied to the first communication node further includes the following.

A performance feedback response message, a performance feedback acknowledge message, a resource state response message or a resource state update message which is sent by the second communication node is received. The performance feedback response message, the performance feedback acknowledge message, the resource state response message or the resource state update message carries indication success information. In the embodiment, in the case where the second communication node periodically reports the performance feedback measurement information to the first communication node, the second communication node sends the performance feedback response message, the performance feedback acknowledge message, the resource state response message or the resource state update message which carries the indication success information to the first communication node so that the first communication node knows configuration success of performance feedback indicated in the performance feedback request message according to the performance feedback response message, the performance feedback acknowledge message, the resource state response message or the resource state update message.

In an embodiment, the reporting manner for the performance feedback is periodic reporting, and the performance feedback measurement information is included in a handover success message.

The communication method applied to the first communication node further includes the following.

A handover request acknowledge message sent by the second communication node is received, where the handover request acknowledge message carries indication success information. In the embodiment, in the case where the second communication node periodically reports the performance feedback measurement information to the first communication node, the second communication node sends the handover request acknowledge message carrying the indication success information to the first communication node so that the first communication node knows configuration success of performance feedback indicated in the performance feedback request message according to the handover request acknowledge message.

In an embodiment, the reporting manner for the performance feedback is periodic reporting, and receiving the performance feedback measurement information corresponding to the performance feedback request message and sent by the second communication node includes: periodically receiving the performance feedback measurement information corresponding to the performance feedback request message and sent by the second communication node. In the embodiment, after the first communication node receives the performance feedback response message, the performance feedback acknowledge message, the resource state response message, the resource state update message or the handover request acknowledge message which is sent by the second communication node, the second communication node periodically sends the performance feedback measurement information to the first communication node so that the first communication node determines whether the retraining operation or the use termination operation is required to be performed on the target model.

Figure 2:
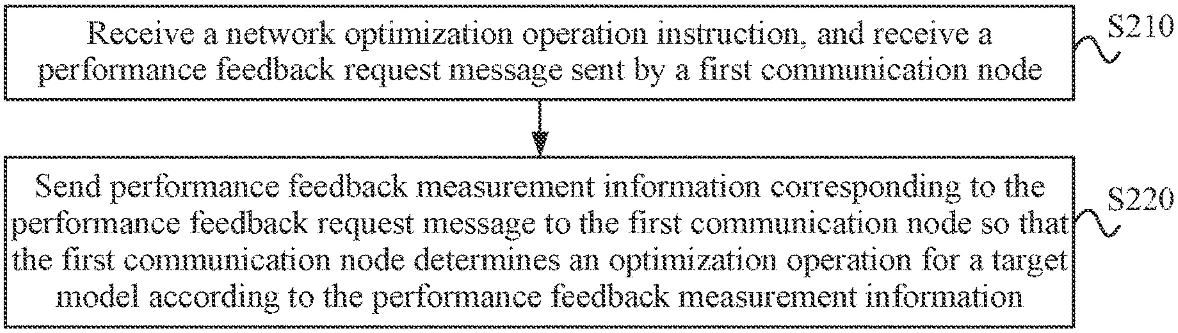
FIG. 2 is a flowchart of another communication method according to an embodiment of the present application.

In an embodiment, FIG. 2 is a flowchart of another communication method according to an embodiment of the present application. The embodiment may be performed by a second communication node. Exemplarily, the second communication node may be a NG-RAN node. As shown in FIG. 2, the embodiment includes S210 and S220.

In S210, a network optimization operation instruction is received, and a performance feedback request message sent by a first communication node is received.

In S220, performance feedback measurement information corresponding to the performance feedback request message is sent to the first communication node so that the first communication node determines an optimization operation for a target model according to the performance feedback measurement information.

In the embodiment, in the case where the second communication node receives the network optimization operation instruction, the first communication node sends the performance feedback request message to the second communication node, and the second communication node measures the performance of the target model according to the received performance feedback request message to obtain the corresponding performance feedback measurement information; then the second communication node sends the performance feedback measurement information to the first communication node so that the first communication node determines whether to perform the optimization operation on the target model according to the performance feedback measurement information.

In an embodiment, the performance feedback measurement information includes at least one of: a time duration for performance feedback, a cell identifier (ID), a cell resource state, PRB usage, a cell PDCP data volume, energy efficiency, system-level performance, quality of experience (QoE) of a terminal, cell-level location information of a UE, geographical location-level location information of a UE, accuracy of predicted information or prediction error.

The time duration for the performance feedback includes at least one of: time granularity, start time of performance feedback information or end time of performance feedback information.

In an embodiment, the performance feedback request message includes at least one of following measurement parameters: an identifier of a performance feedback data type, a UE identifier, a time duration for performance feedback or a reporting manner for performance feedback. The identifier of the performance feedback data type is configured to indicate a type of performance feedback data.

In an embodiment, the identifier of the performance feedback data type is configured to indicate at least one of: UE-related type data, network load-related type data, energy efficiency-related type data, prediction accuracy-related type data or prediction error-related type data.

In an embodiment, the reporting manner for the performance feedback is aperiodic reporting, and the performance feedback measurement information is included in one of following messages: a performance feedback response message, a performance feedback acknowledge message, a handover success message, a resource state response message or a resource state update massage.

In an embodiment, the reporting manner for the performance feedback is periodic reporting, and the communication method applied to the second communication node further includes the following.

A performance feedback response message, a performance feedback acknowledge message, a resource state response message or a resource state update message is sent to the first communication node, where the performance feedback response message, the performance feedback acknowledge message, the resource state response message or the resource state update message carries indication success information.

In an embodiment, the reporting manner for the performance feedback in the performance feedback request message is periodic reporting, and the performance feedback measurement information is included in a handover success message.

The communication method applied to the second communication node further includes the following.

A handover request acknowledge message is sent to the first communication node, where the handover request acknowledge message carries indication success information.

In an embodiment, the reporting manner for the performance feedback is periodic reporting, and sending the performance feedback measurement information corresponding to the performance feedback request message to the first communication node includes the following.

The performance feedback measurement information corresponding to the performance feedback request message is periodically sent to the first communication node.

It is to be noted that for the explanation of various parameters in the communication method applied to the second communication node, reference may be made to the description of corresponding parameters in the communication method applied to the first communication node in the preceding embodiment, which is not repeated here.

Figure 3:
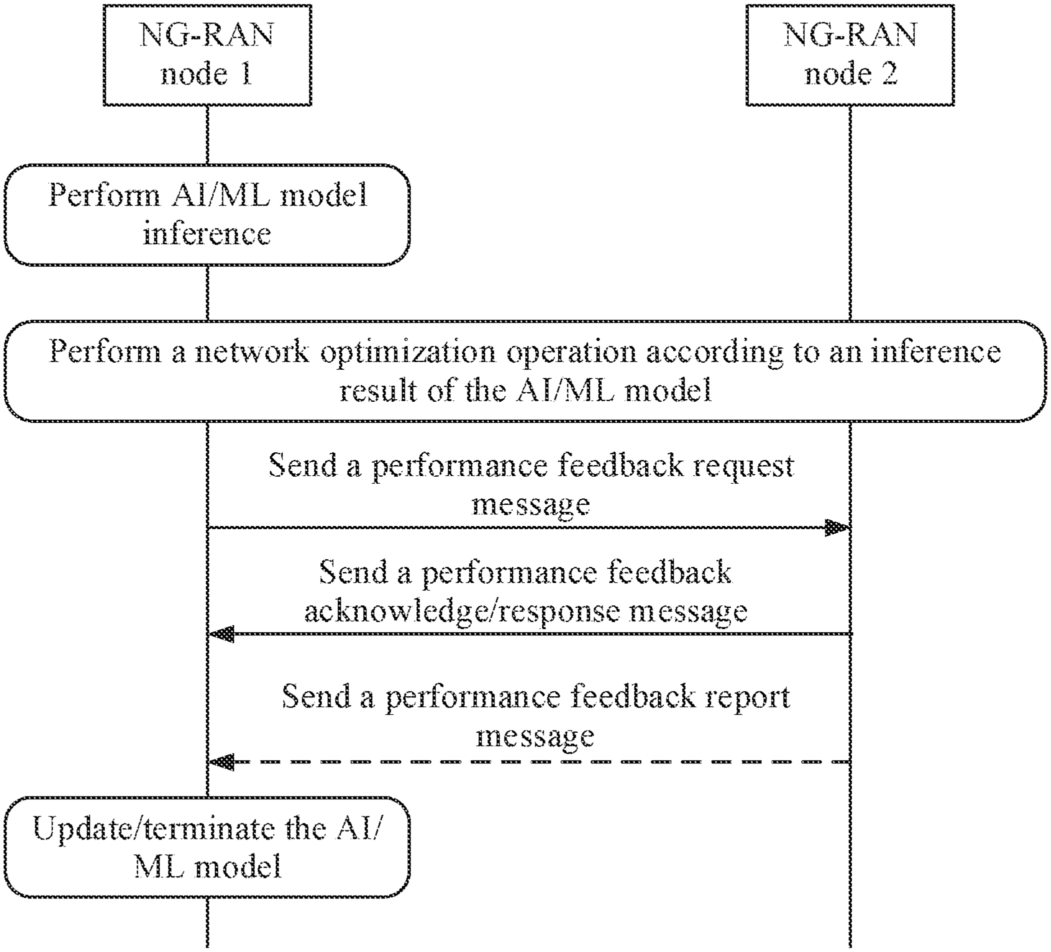
FIG. 3 is a flowchart of new performance feedback interaction established between base stations according to an embodiment of the present application.

In an embodiment, FIG. 3 is a flowchart of new performance feedback interaction established between base stations according to an embodiment of the present application. In the embodiment, an example where the first communication node is NG-RAN node 1, the second communication node is NG-RAN node 2, both NG-RAN node 1 and NG-RAN node 2 are base stations, and the target model is an AI model or an ML model is used for illustrating establishing a new performance feedback interaction process between two base stations. As shown in FIG. 3, the new performance feedback interaction process between the two base stations in the embodiment includes steps described below.

In step 1, NG-RAN node 1 performs AI/ML model inference.

In step 2, NG-RAN node 1 and NG-RAN node 2 perform a network optimization operation according to an inference result of the AI/ML model.

Exemplarily, the network optimization operation may include a UE handover indication, a cell turning on or off indication, a radio resource activation/deactivation indication, a power adjustment indication, an RRM parameter reconfiguration indication, a flow splitting operation indication, a protocol layer parameter reconfiguration indication, etc.

In step 3, NG-RAN node 1 sends a performance feedback request message (Feedback Performance Request Message) to NG-RAN node 2.

The performance feedback request message is used for indicating the requested performance feedback measurement information (Feedback performance) to NG-RAN node 2. The performance feedback request message includes one or more of following items: one or more identifiers of performance feedback data types, one or more UE identifiers (UE IDs), a time duration for performance feedback and a reporting manner for performance feedback. The identifier of the performance feedback data type is configured to indicate a type of requested performance feedback data. For example, the identifier of the performance feedback data type may include: UE-related type data, network load-related type data, energy efficiency-related type data, prediction accuracy-related type data, prediction error-related type data, etc. The time duration for the performance feedback includes one or more of following items: time granularity, start time of performance feedback information and end time of performance feedback information. The reporting manner for the performance feedback includes periodic reporting or aperiodic reporting.

In step 4, NG-RAN node 2 sends a performance feedback acknowledge/response message (Feedback Performance Acknowledge/Response).

In the embodiment, if the performance feedback request message indicates aperiodic reporting, the performance feedback acknowledge/response message carries the performance feedback measurement information requested by NG-RAN node 1. The performance feedback measurement information includes one or more of following items: a time duration for performance feedback (the time duration for the performance feedback includes one or more of following items: time granularity, start time of performance feedback information and end time of performance feedback information), a cell ID, a cell resource state, physical resource block (PRB) usage, a cell PDCP data volume, energy efficiency, system-level performance, QoE of a terminal, cell-level location information of a UE, geographical location-level location information of a UE, accuracy of predicted information (such as accuracy of predicted load, accuracy of predicted UE location or accuracy of predicted UE trajectory), prediction error (such as an error of a predicted load, an error of a predicted UE location or an error of a predicted UE trajectory), etc.

In the embodiment, if the performance feedback request message indicates periodic reporting and the configuration indicated in the performance feedback request message is successful, the performance feedback acknowledge/response message carries indication success information. NG-RAN node 2 starts corresponding measurement according to the periodic manner and the periodic information configured in the performance feedback request message, and periodically sends the performance feedback measurement information to NG-RAN node 1. The performance feedback measurement information may be carried in a performance feedback report message (Feedback Performance Report). The performance feedback report message includes one or more of following items: a time duration for performance feedback (the time duration for the performance feedback includes one or more of following items: time granularity, start time of performance feedback information and end time of performance feedback information), a cell ID, a cell resource state, physical resource block (PRB) usage, a cell PDCP data volume, energy efficiency, system-level performance, QoE of a terminal, cell-level location information of a UE, geographical location-level location information of a UE, accuracy of predicted information (such as accuracy of predicted load, accuracy of predicted UE location or accuracy of predicted UE trajectory), prediction error (such as an error of a predicted load, an error of a predicted UE location or an error of a predicted UE trajectory), etc.

In step 5, NG-RAN node 1 determines whether the AL/ML model needs to be retrained or terminated according to the performance feedback measurement information fed back by NG-RAN node 2.

Figure 4:
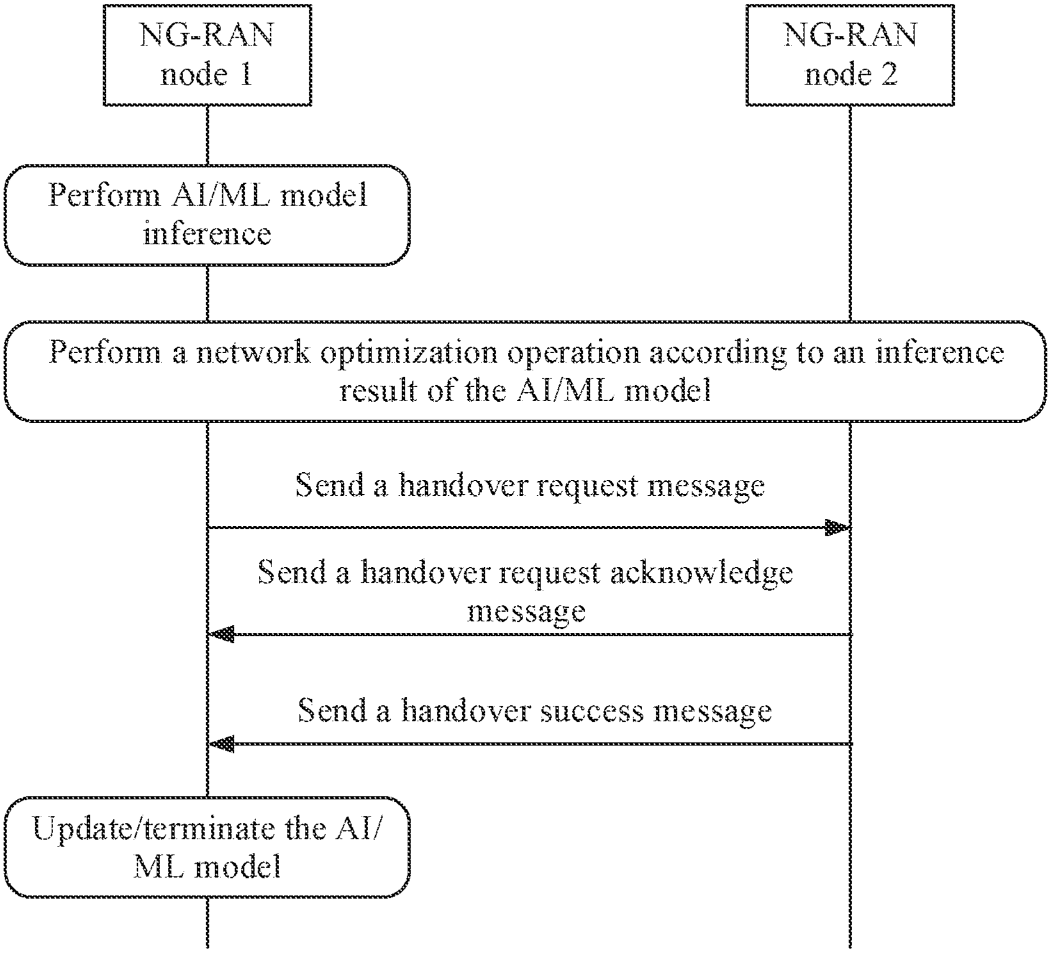
FIG. 4 is a flowchart of multiplexing handover interaction information between base stations according to an embodiment of the present application.

In an embodiment, FIG. 4 is a flowchart of multiplexing handover interaction information between base stations according to an embodiment of the present application. In the embodiment, an example where the first communication node is NG-RAN node 1, the second communication node is NG-RAN node 2, and both NG-RAN node 1 and NG-RAN node 2 are base stations is used for illustrating the transmission of the performance feedback measurement information through multiplexing handover interaction information between two base stations. As shown in FIG. 4, in the embodiment, the transmission process of the performance feedback measurement information through multiplexing the handover interaction information includes steps described below.

In step 1, NG-RAN node 1 performs AI/ML model inference.

In step 2, NG-RAN node 1 and NG-RAN node 2 perform a network optimization operation according to an inference result of the AI/ML model.

Exemplarily, the network optimization operation may include a UE handover indication, a cell turning on or off indication, a radio resource activation/deactivation indication, a power adjustment indication, an RRM parameter reconfiguration indication, a flow splitting operation indication, a protocol layer parameter reconfiguration indication, etc.

In step 3, NG-RAN node 1 sends a handover request message (Handover Request) to NG-RAN node 2.

The handover request message is used for indicating the requested performance feedback measurement information (Feedback performance) to NG-RAN node 2. The handover request message includes the performance feedback request message, and the performance feedback request message includes one or more of following items: one or more identifiers of performance feedback data types, one or more UE identifiers (UE IDs), a time duration for performance feedback and a reporting manner for performance feedback. The identifier of the performance feedback data type is configured to indicate a type of requested performance feedback data. For example, the identifier of the performance feedback data type may include: UE-related type data, network load-related type data, energy efficiency-related type data, prediction accuracy-related type data, prediction error-related type data, etc. The time duration for the performance feedback includes one or more of following items: time granularity, start time of performance feedback information and end time of performance feedback information. The reporting manner for the performance feedback includes periodic reporting or aperiodic reporting.

In step 4, if NG-RAN node 2 performs successful configuration according to the information in the handover request message, NG-RAN node 2 sends handover request acknowledge message (Handover Request Acknowledge).

In step 5, NG-RAN node 2 sends a handover success message (Handover Success) to NG-RAN node 1.

The handover success message carries a performance feedback message indicated in the request message.

In the embodiment, if the handover request message indicates aperiodic reporting, the handover success message carries the performance feedback measurement information requested by NG-RAN node 1. The performance feedback measurement information includes one or more of following items: a time duration for performance feedback (the time duration for the performance feedback includes one or more of following items: time granularity, start time of performance feedback information and end time of performance feedback information), a cell ID, a cell resource state, physical resource block (PRB) usage, a cell PDCP data volume, energy efficiency, system-level performance, QoE of a terminal, cell-level location information of a UE, geographical location-level location information of a UE, accuracy of predicted information (such as accuracy of predicted load, accuracy of predicted UE location or accuracy of predicted UE trajectory), prediction error (such as an error of a predicted load, an error of a predicted UE location or an error of a predicted UE trajectory), etc.

In the embodiment, if the handover request message indicates periodic reporting, NG-RAN node 2 starts the corresponding measurement according to the periodic manner and the periodic information configured in the handover request message and sends the handover success message. The handover success message includes one or more of following items: a time duration for performance feedback (the time duration for the performance feedback includes one or more of following items: time granularity, start time of performance feedback information and end time of performance feedback information), a cell ID, a cell resource state, physical resource block (PRB) usage, a cell PDCP data volume, energy efficiency, system-level performance, QoE of a terminal, cell-level location information of a UE, geographical location-level location information of a UE, accuracy of predicted information (such as accuracy of predicted load, accuracy of predicted UE location or accuracy of predicted UE trajectory), prediction error (such as an error of a predicted load, an error of a predicted UE location or an error of a predicted UE trajectory), etc.

In step 5, NG-RAN node 1 determines whether the AL/ML model needs to be retrained or terminated according to the performance feedback measurement information fed back by NG-RAN node 2.

Figure 5:
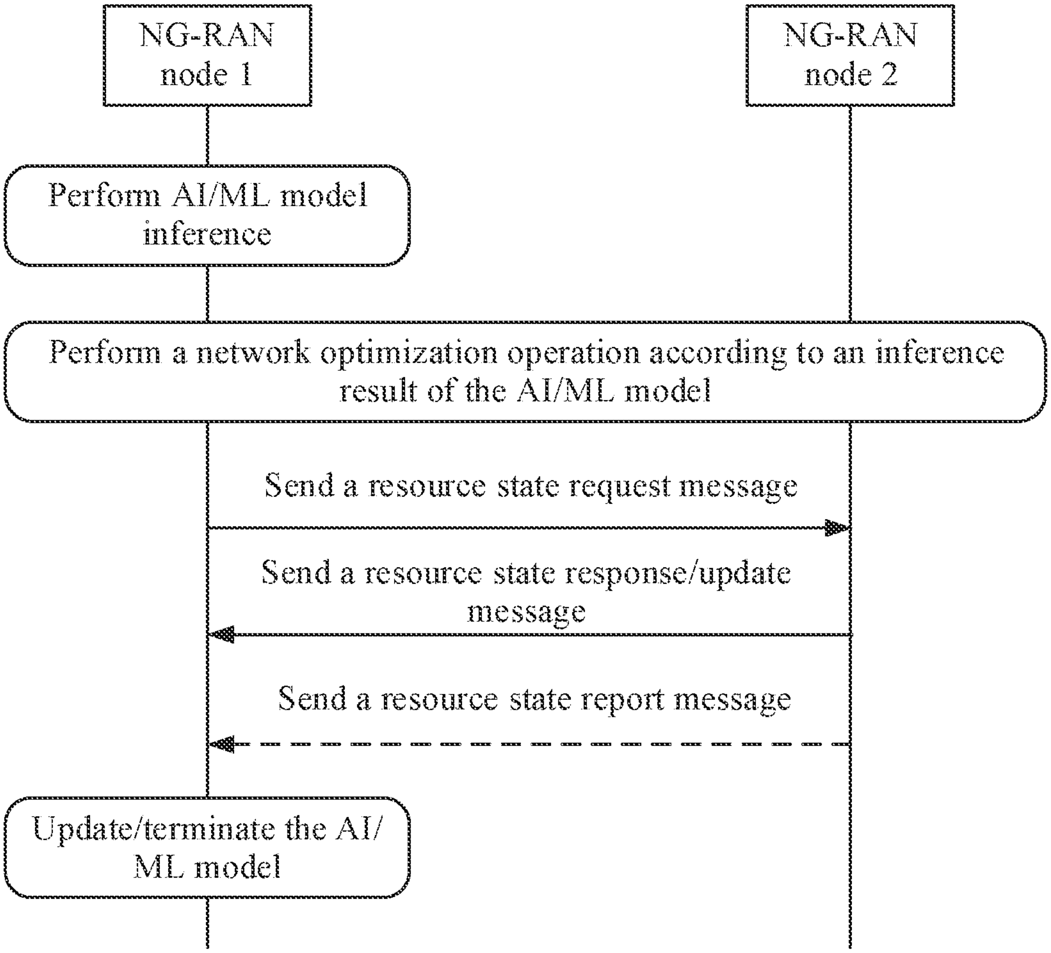
FIG. 5 is a flowchart of multiplexing resource state interaction information between base stations according to an embodiment of the present application.

In an embodiment, FIG. 5 is a flowchart of multiplexing resource state interaction information between base stations according to an embodiment of the present application. In the embodiment, an example where the first communication node is NG-RAN node 1, the second communication node is NG-RAN node 2, and both NG-RAN node 1 and NG-RAN node 2 are base stations is used for illustrating the transmission of the performance feedback measurement information through multiplexing resource state interaction information between two base stations. As shown in FIG. 5, in the embodiment, the transmission process of the performance feedback measurement information through multiplexing the resource state interaction information includes steps described below.

In step 1, NG-RAN node 1 performs AI/ML model inference.

In step 2, NG-RAN node 1 and NG-RAN node 2 perform a network optimization operation according to an inference result of the AI/ML model.

Exemplarily, the network optimization operation may include a UE handover indication, a cell turning on or off indication, a radio resource activation/deactivation indication, a power adjustment indication, an RRM parameter reconfiguration indication, a flow splitting operation indication, a protocol layer parameter reconfiguration indication, etc.

In step 3, NG-RAN node 1 sends a resource state request message to NG-RAN node 2.

The resource state request message is used for indicating the requested performance feedback measurement information to NG-RAN node 2. The resource state request message includes the performance feedback request message, and the performance feedback request message includes one or more of following items: one or more identifiers of performance feedback data types, one or more UE identifiers (UE IDs), a time duration for performance feedback and a reporting manner for performance feedback. The identifier of the performance feedback data type is used for indicating a type of requested performance feedback data. For example, the identifier of the performance feedback data type may include: UE-related type data, network load-related type data, energy efficiency-related type data, prediction accuracy-related type data, prediction error-related type data, etc. The time duration for the performance feedback includes one or more of following items: time granularity, start time of performance feedback information and end time of performance feedback information. The reporting manner for the performance feedback includes periodic reporting or aperiodic reporting.

In step 4, NG-RAN node 2 sends a resource state response/update message (Resource Status Response/Update).

In the embodiment, if the resource state request message indicates aperiodic reporting, the resource state response/update message carries the performance feedback measurement information requested by NG-RAN node 1. The performance feedback measurement information includes one or more of following items: a time duration for performance feedback (the time duration for the performance feedback includes one or more of following items: time granularity, start time of performance feedback information and end time of performance feedback information), a cell ID, a cell resource state, physical resource block (PRB) usage, a cell PDCP data volume, energy efficiency, system-level performance, QoE of a terminal, cell-level location information of a UE, geographical location-level location information of a UE, accuracy of predicted information (such as accuracy of predicted load, accuracy of predicted UE location or accuracy of predicted UE trajectory), prediction error (such as an error of a predicted load, an error of a predicted UE location or an error of a predicted UE trajectory), etc.

In the embodiment, if the resource state request message indicates periodic reporting, and the configuration indicated in the resource state request message is successful, the resource state response message or the resource state update message carries a success indication. NG-RAN node 2 starts corresponding measurement according to the periodic manner and the periodic information configured in the resource state request message, and periodically sends the performance feedback measurement information to NG-RAN node 1. The performance feedback measurement information may be carried in a resource state report message (Resource Status Report). The performance feedback report message includes one or more of following items: a time duration for performance feedback (the time duration for the performance feedback includes one or more of following items: time granularity, start time of performance feedback information and end time of performance feedback information), a cell ID, a cell resource state, physical resource block (PRB) usage, a cell PDCP data volume, energy efficiency, system-level performance, QoE of a terminal, cell-level location information of a UE, geographical location-level location information of a UE, accuracy of predicted information (such as accuracy of predicted load, accuracy of predicted UE location or accuracy of predicted UE trajectory), prediction error (such as an error of a predicted load, an error of a predicted UE location or an error of a predicted UE trajectory), etc.

In step 5, NG-RAN node 1 determines whether the AL/ML model needs to be retrained or terminated according to the performance feedback measurement information fed back by NG-RAN node 2.

Figure 6:
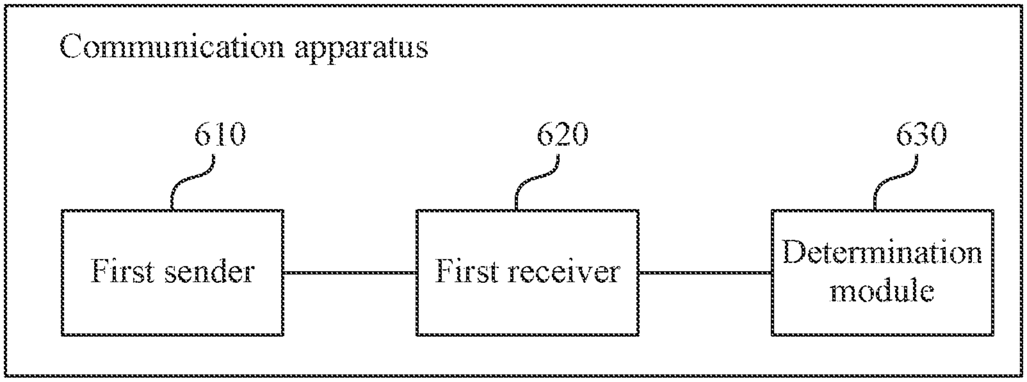
FIG. 6 is a block diagram of a communication apparatus according to an embodiment of the present application.

In an embodiment, FIG. 6 is a block diagram of a communication apparatus according to an embodiment of the present application. The embodiment is applied to a first communication node. As shown in FIG. 6, the embodiment includes a first sender 610, a first receiver 620 and a determination module 630.

The first sender 610 is configured to receive a network optimization operation instruction and send a performance feedback request message to a second communication node.

The first receiver 620 is configured to receive performance feedback measurement information corresponding to the performance feedback request message and sent by the second communication node.

The determination module 630 is configured to determine an optimization operation for a target model according to the performance feedback measurement information.

In an embodiment, the performance feedback measurement information includes at least one of: a time duration for performance feedback, a cell identifier (ID), a cell resource state, physical resource block (PRB) usage, a cell packet data convergence protocol (PDCP) data volume, energy efficiency, system-level performance, quality of experience (QoE) of a terminal, cell-level location information of a user equipment (UE), geographical location-level location information of a UE, accuracy of predicted information or prediction error.

The time duration for the performance feedback includes at least one of: time granularity, start time of performance feedback information or end time of performance feedback information.

In an embodiment, the performance feedback request message includes at least one of following measurement parameters: an identifier of a performance feedback data type, a UE identifier, a time duration for performance feedback or a reporting manner for performance feedback. The identifier of the performance feedback data type is configured to indicate a type of performance feedback data.

In an embodiment, the performance feedback request message is included in one of following messages: a handover request message or a resource state request message.

In an embodiment, the identifier of the performance feedback data type is configured to indicate at least one of: UE-related type data, network load-related type data, energy efficiency-related type data, prediction accuracy-related type data or prediction error-related type data.

In an embodiment, the reporting manner for the performance feedback is aperiodic reporting, and the performance feedback measurement information is included in one of following messages: a performance feedback response message, a performance feedback acknowledge message, a handover success message, a resource state response message or a resource state update massage.

In an embodiment, the reporting manner for the performance feedback is periodic reporting, and the communication apparatus applied to the first communication node further includes a second receiver.

The second receiver is configured to receive a performance feedback response message, a performance feedback acknowledge message, a resource state response message or a resource state update message which is sent by the second communication node. The performance feedback response message, the performance feedback acknowledge message, the resource state response message or the resource state update message carries indication success information.

In an embodiment, the reporting manner for the performance feedback is periodic reporting, and the performance feedback measurement information is included in a handover success message.

The communication apparatus applied to the first communication node further includes a third receiver.

The third receiver is configured to receive a handover request acknowledge message sent by the second communication node, where the handover request acknowledge message carries indication success information.

In an embodiment, the reporting manner for the performance feedback is periodic reporting, and the first receiver 620 performs the operation described below.

The performance feedback measurement information corresponding to the performance feedback request message and sent by the second communication node is periodically received.

The communication apparatus provided in the embodiment is configured to perform the communication method applied to a first communication node in the embodiment shown in FIG. 1 and has similar implementation principles and technical effects, which are not repeated here.

Figure 7:
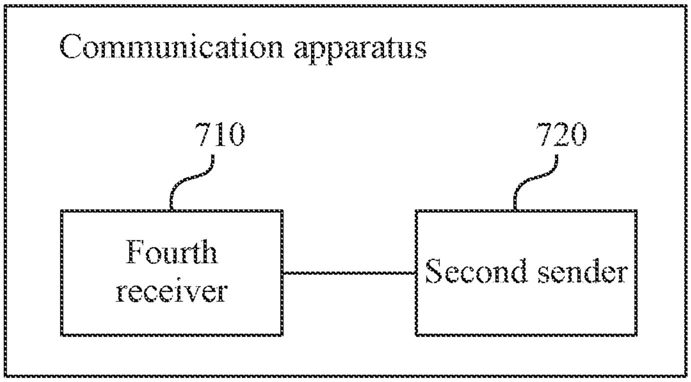
FIG. 7 is a block diagram of another communication apparatus according to an embodiment of the present application.

In an embodiment, FIG. 7 is a block diagram of another communication apparatus according to an embodiment of the present application. The embodiment is applied to a second communication node. As shown in FIG. 7, the embodiment includes a fourth receiver 710 and a second sender 720.

The fourth receiver 710 is configured to receive a network optimization operation instruction, and receive a performance feedback request message sent by a first communication node.

The second sender 720 is configured to send performance feedback measurement information corresponding to the performance feedback request message to the first communication node so that the first communication node determines an optimization operation for a target model according to the performance feedback measurement information. In an embodiment, the performance feedback measurement information includes at least one of: a time duration for performance feedback, a cell identifier (ID), a cell resource state, physical resource block (PRB) usage, a cell packet data convergence protocol (PDCP) data volume, energy efficiency, system-level performance, quality of experience (QoE) of a terminal, cell-level location information of a user equipment (UE), geographical location-level location information of a UE, accuracy of predicted information or prediction error.

The time duration for the performance feedback includes at least one of: time granularity, start time of performance feedback information or end time of performance feedback information.

In an embodiment, the performance feedback request message includes at least one of following measurement parameters: an identifier of a performance feedback data type, a UE identifier, a time duration for performance feedback or a reporting manner for performance feedback. The identifier of the performance feedback data type is configured to indicate a type of performance feedback data.

In an embodiment, the performance feedback request message is included in one of following messages: a handover request message or a resource state request message.

In an embodiment, the identifier of the performance feedback data type is configured to indicate at least one of: UE-related type data, network load-related type data, energy efficiency-related type data, prediction accuracy-related type data or prediction error-related type data.

In an embodiment, the reporting manner for the performance feedback is aperiodic reporting, and the performance feedback measurement information is included in one of following messages: a performance feedback response message, a performance feedback acknowledge message, a handover success message, a resource state response message or a resource state update massage.

In an embodiment, the reporting manner for the performance feedback is periodic reporting, and a performance feedback response message, a performance feedback acknowledge message, a resource state response message or a resource state update message which is used for carrying the performance feedback measurement information carries indication success information.

In an embodiment, the reporting manner for the performance feedback is periodic reporting, and the communication apparatus applied to the second communication node further includes a third sender.

The third sender is configured to send a performance feedback response message, a performance feedback acknowledge message, a resource state response message or a resource state update message to the first communication node, where the performance feedback response message, the performance feedback acknowledge message, the resource state response message or the resource state update message carries indication success information.

In an embodiment, the reporting manner for the performance feedback in the performance feedback request message is periodic reporting, and the performance feedback measurement information is included in a handover success message.

The communication apparatus applied to the second communication node further includes a fourth sender.

The fourth sender is configured to send a handover request acknowledge message to the first communication node, where the handover request acknowledge message carries indication success information.

In an embodiment, the reporting manner for the performance feedback is periodic reporting, and the second sender 720 performs the operation described below.

The performance feedback measurement information corresponding to the performance feedback request message is periodically sent to the first communication node.

The communication apparatus provided in the embodiment is configured to perform the communication method applied to a second communication node in the embodiment shown in FIG. 2 and has similar implementation principles and technical effects, which are not repeated here.

Figure 8:
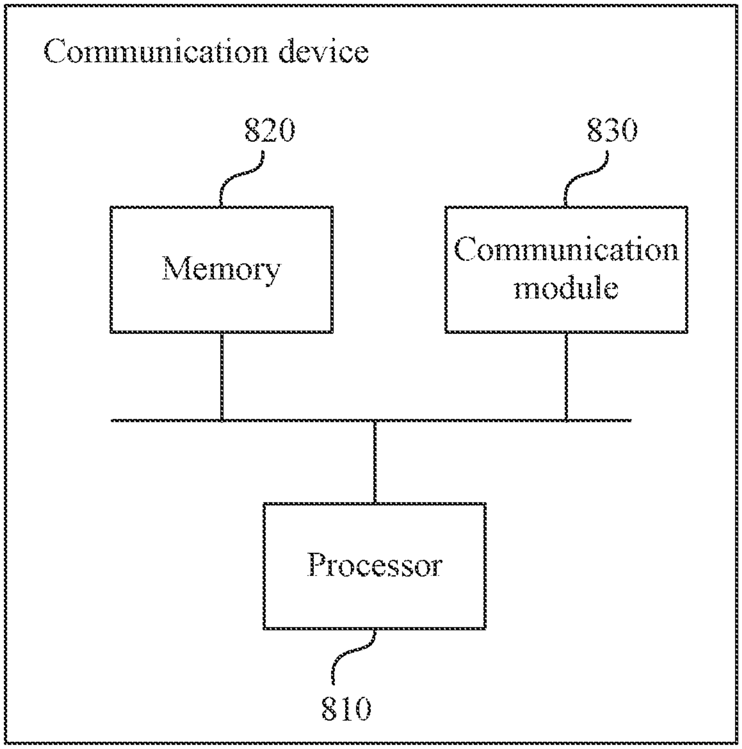
FIG. 8 is a structural diagram of a communication device according to an embodiment of the present application.

FIG. 8 is a structural diagram of a communication device according to an embodiment of the present application. As shown in FIG. 8, the device provided in the present application includes a processor 810, a memory 820 and a communication module 830. One or more processors 810 may be included in the device. One processor 810 is shown as an example in FIG. 8. One or more memories 820 may be included in the device. One memory 820 is shown as an example in FIG. 8. The processor 810, the memory 820 and the communication module 830 in the device may be connected via a bus or in other manners. The connection via a bus is shown as an example in FIG. 8. In the embodiment, the device may be a base station.

As a computer-readable storage medium, the memory 820 may be configured to store software programs and computer-executable programs and modules, such as program instructions/modules (for example, the first sender 610, the first receiver 620 and the determination module 630 in the communication apparatus) corresponding to the device according to any embodiment of the present application. The memory 820 may include a program storage region and a data storage region. The program storage region may store an operating system and an application program required by at least one function. The data storage region may store data created according to the use of the device. In addition, the memory 820 may include a high-speed random-access memory and may further include a nonvolatile memory, such as at least one disk memory, a flash memory or another nonvolatile solid-state memory. In some examples, the memory 820 may further include memories located remotely relative to the processor 810, and these remote memories may be connected to the device via a network. Examples of the preceding network include, but are not limited to, the Internet, an intranet, a local area network, a mobile communication network and a combination thereof.

The communication module 830 is configured to communicatively interact with other communication nodes.

In the case where the communication device is the first communication node, the preceding device may be configured to perform the communication method applied to the first communication node in any one of the preceding embodiments and has corresponding functions and effects.

In the case where the communication device is the second communication node, the preceding device may be configured to perform the communication method applied to the second communication node in any one of the preceding embodiments and has corresponding functions and effects.

An embodiment of the present application further provides a storage medium including computer-executable instructions which, when executed by a computer processor, are configured to execute a communication method applied to a first communication node. The method includes: receiving a network optimization operation instruction, and sending a performance feedback request message to a second communication node; receiving performance feedback measurement information corresponding to the performance feedback request message and sent by the second communication node; and determining an optimization operation for a target model according to the performance feedback measurement information.

An embodiment of the present application further provides a storage medium including computer-executable instructions which, when executed by a computer processor, are configured to execute a communication method applied to a second communication node. The method includes: receiving a network optimization operation instruction, and receiving a performance feedback request message sent by a first communication node; and sending performance feedback measurement information corresponding to the performance feedback request message to the first communication node so that the first communication node determines an optimization operation for a target model according to the performance feedback measurement information.

It is to be understood by those skilled in the art that the term user equipment covers any suitable type of wireless user equipment, for example, a mobile phone, a portable data processing device, a portable web browser or a vehicle-mounted mobile station.

Generally speaking, the embodiments of the present application may be implemented in hardware or special-purpose circuits, software, logic or any combination thereof. For example, some aspects may be implemented in hardware while other aspects may be implemented in firmware or software executable by a controller, a microprocessor or another computing apparatus, though the present application is not limited thereto.

The embodiments of the present application may be implemented through the execution of computer program instructions by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, state setting data, or source or object codes written in any combination of one or more programming languages.

A block diagram of any logic flow among the drawings of the present application may represent program steps, may represent interconnected logic circuits, modules and functions, or may represent a combination of program steps and logic circuits, modules and functions. Computer programs may be stored on a memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disc (CD)). Computer-readable media may include non-transitory storage media. The data processor may be of any type suitable for a local technical environment, such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The above are merely preferred embodiments of the present application and are not intended to limit the present application. For those skilled in the art, the present application may have various modifications and variations. Any modifications, equivalent substitutions, improvements and the like made within the spirit and principle of the present application should fall within the scope of the present application.

What is claimed is:

1. A communication method, the method being applied to a first communication node and comprising:

sending a performance feedback request message to a second communication node, the performance feedback request message comprising at least an identifier of a performance feedback data type configured to indicate a type fo performance feedback data; and receiving performance feedback measurement information corresponding to the performance feedback request message from the second communication node, wherein the performance feedback measurement information comprises at least cell-level location information of a user equipment.

2. The method according to claim 1, wherein the performance feedback measurement information further comprises at least one of: a time duration for performance feedback, a cell identifier (ID), energy efficiency and the method further comprises performing an optimization operation for an artificial intelligence (AI) or machine learning (ML) model residing at the first communication node according to the performance feedback measurement information.

3. The method according to claim 2, wherein the time duration for the performance feedback comprises at least one of: time granularity, start time of performance feedback information or end time of performance feedback information.

4. The method according to claim 1, wherein the performance feedback request message further comprises at least one of following measurement parameters: a time duration for performance feedback or a reporting timing for performance feedback.

5. The method according to claim 1, wherein the performance feedback request message is comprised in one of following messages: a handover request message, a resource state request message or a performance feedback request message.

6. The method according to claim 1, wherein the identifier of the performance feedback data type is configured to indicate at least one of: UE-related type data, network load-related type data, or energy efficiency-related type data.

7. The method according to claim 4, wherein the reporting timing for the performance feedback is aperiodic reporting, and the performance feedback measurement information is comprised in one of following messages: a performance feedback response message, a performance feedback acknowledge message, a handover success message, a resource state response message or a resource state update massage.

8. The method according to claim 4, wherein the reporting timing for the performance feedback is periodic reporting, and the method further comprises:

receiving a performance feedback response message, a performance feedback acknowledge message, a resource state response message or a resource state update message which is sent by the second communication node, wherein the performance feedback response message, the performance feedback acknowledge message, the resource state response message or the resource state update message carries indication success information.

9. The method according to claim 4, wherein the reporting timing for the performance feedback is periodic reporting, and the performance feedback measurement information is comprised in a handover success message; and the method further comprises:

receiving a handover request acknowledge message sent by the second communication node, wherein the handover request acknowledge message carries indication success information.

10. The method according to claim 8, wherein the reporting timing for the performance feedback is periodic reporting, and receiving the performance feedback measurement information corresponding to the performance feedback request message and sent by the second communication node comprises:

periodically receiving the performance feedback measurement information corresponding to the performance feedback request message and sent by the second communication node.

11. The method according to claim 9, wherein the reporting timing for the performance feedback is periodic reporting, and receiving the performance feedback measurement information corresponding to the performance feedback request message and sent by the second communication node comprises:

periodically receiving the performance feedback measurement information corresponding to the performance feedback request message and sent by the second communication node.

12. A communication method, the method being applied to a second communication node, comprising:

receiving a performance feedback request message sent by a first communication node, the performance feedback request message comprising at least an identifier of a performance feedback data type configured to indicate a type fo performance feedback data; and sending performance feedback measurement information corresponding to the performance feedback request message to the first communication node, wherein the performance feedback measurement information comprises at least cell-level location information of a user equipment.

13. The method according to claim 12, wherein a reporting manner for performance feedback is periodic reporting, and the method further comprises:

sending a performance feedback response message, a performance feedback acknowledge message, a resource state response message or a resource state update message to the first communication node, wherein the performance feedback response message, the performance feedback acknowledge message, the resource state response message or the resource state update message carries indication success information.

14. The method according to claim 12, wherein a reporting manner for performance feedback in the performance feedback request message is periodic reporting, and the performance feedback measurement information is comprised in a handover success message; and the method further comprises:

sending a handover request acknowledge message to the first communication node, wherein the handover request acknowledge message carries indication success information.

15. The method according to claim 12, wherein a reporting manner for performance feedback is periodic reporting, and sending the performance feedback measurement information corresponding to the performance feedback request message to the first communication node comprises:

periodically sending the performance feedback measurement information corresponding to the performance feedback request message to the first communication node.

16. A communication device, comprising a memory and one or more processors, wherein the memory is configured to store one or more programs; and the one or more programs, when executed by the one or more processors, cause the one or more processors to implement the method according to claim 12.

17. The method according to claim 12, wherein the performance feedback measurement information further comprises at least one of: a time duration for performance feedback, a cell identifier (ID), energy efficiency, or cell-level location information of a user equipment (UE).

18. The method according to claim 12, wherein the performance feedback request message comprises at least one of following measurement parameters:

a time duration for performance feedback or a reporting timing for performance feedback.

19. The method according claim 12, wherein the identifier of the performance feedback data type is configured to indicate at least one of: UE-related type data, network load-related type data, or energy efficiency-related type data.

20. A communication node, comprising a memory and one or more processors, wherein the memory is configured to store one or more programs; and the one or more programs, when executed by the one or more processors, cause the one or more processors to implement the following steps:

sending a performance feedback request message to a second communication node, the performance feedback request message comprising at least an identifier of a performance feedback data type configured to indicate a type fo performance feedback data; and receiving performance feedback measurement information corresponding to the performance feedback request message from the second communication node, wherein the performance feedback measurement information comprises at least cell-level location information of a user equipment.

* * * * *